March 1, 1949.　　　F. J. MUFICH ET AL　　　2,462,989
VALVE MECHANISM
Filed July 18, 1945

FRANK J. MUFICH AND
HOWARD S. ROSS
　　　　INVENTORS

BY George J. Smyth.
　　ATTORNEY

Patented Mar. 1, 1949

2,462,989

UNITED STATES PATENT OFFICE 2,462,989

VALVE MECHANISM

Frank J. Mufich, Inglewood, and Howard S. Ross, Los Angeles, Calif.

Application July 18, 1945, Serial No. 605,788

7 Claims. (Cl. 98—40)

This invention relates to valves, and particularly to valves adapted to be mounted on a wall of a compartment, such as an aircraft compartment, for controllably admitting a fluid thereinto. The fluid may be ambient air admitted directly from the free air stream or from a duct into which one end of the valve opens.

Conventional valves of this general nature are quite complex in proportion to their size and scope of utility, especially if they are adjustable not only to control the volume of air admitted but to also control the angle at which the fluid is directed into the compartment. Moreover, when adjustable for any purpose, their range of adjustability is very limited. This is particularly true with reference to altering the direction of fluid discharged. They are rather difficult to adjust, requiring the manipulation of several frictionally mounted parts. They are quite difficult to install and usually necessitate the employment of a complex wall bracket or a split-type of mounting member.

The present invention provides a valve which obviates all these disadvantages and difficulties and constitutes a simple, compact yet efficient valvular article.

The valve is characterized by the ease with which it can be mounted or assembled in the wall. The mounting means are unitary and undivided and hence facilitate installation.

Notwithstanding its simplicity and compactness, the valve has as wide a range of adjustability as previously proposed valvular articles of this general type, both as regards controlling the angles through which the fluid can be directed into the compartment, and as regards the volume of fluid admitted.

The valve has but two moving parts and the manipulation of one of these parts effects adjustment both of the volume and the direction of flow of the fluid. This part can be easily moved in substantially any desired direction by the use of a thumb and finger. Because of the small number, and the improved arrangement, of moving parts, it is virtually impossible for the valve to jam or otherwise become inoperative.

The construction comprising but a small number of parts which are simple and require no precision machine work, the cost of manufacture, and hence the sales price, of the valvular article are comparatively low.

By virtue of the simplicity and ruggedness of its parts, the article is quite durable, and not likely to fail in service.

The presently preferred embodiment of the invention is illustrated in the accompanying drawings and described hereinafter, but in an exemplificatory manner only, the inventive concepts being limited in the embodiments which they can take, only by the scope of the subjoined claims.

Figure 1:
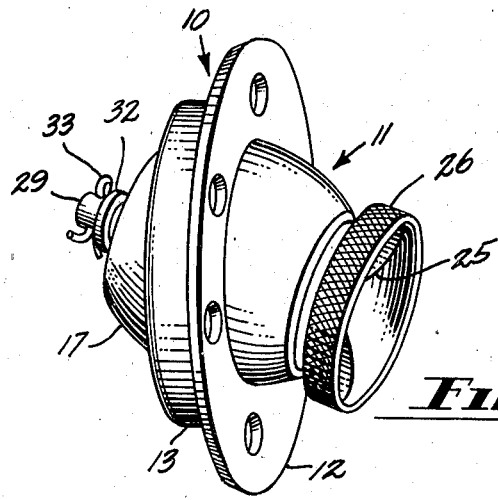
Figure 1 is a perspective of the valvular article mounted in its attaching member.
Figure 2:
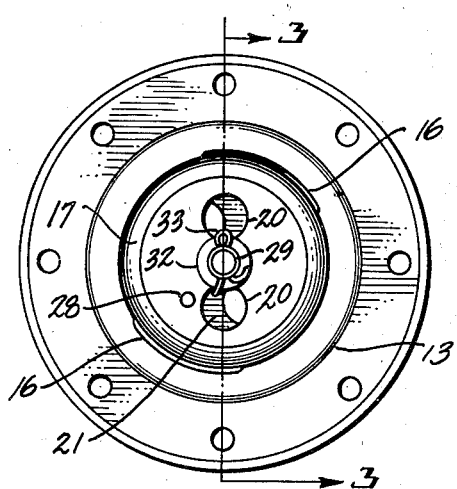
Figure 2 is a rear view thereof.
Figure 3:
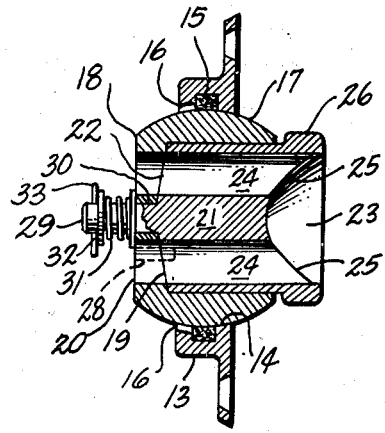
Figure 3 is a section taken on line 3—3 of Figure 2.
Figure 4:
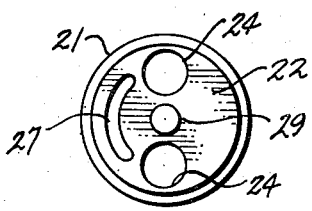
Figure 4 is a rear view of the valve closure member or rotor.

The article comprises, broadly, a one-piece mounting member 10, and a valvular unit 11 mounted therein for substantially universal movement to control the direction and volume of the fluid as it is admitted into the compartment.

The mounting member consists of a circular attaching plate 12 having a hollow boss or collar 13 extending normal to one face thereof. This member is adapted to be mounted on a wall with its bore coaxial with a ventilating aperture in the wall.

The inner surface 14 of the collar 13 has a spherical contour; that is, the inner wall is warped outwardly on the radii of a portion of a sphere. The inner surface of the collar, at one end thereof, and in diametrically opposed locations, is provided with arcuate kerfs or grooves 16, the faces of which are outwardly inclined.

A valve body 17, in the form of a hollow zone of a sphere, is adapted to be inserted through the grooves 16 and mounted in the spherical seat provided in the mounting member 10, in a manner hereinafter described. One end of the spherical zone is open and the other end is closed by a wall 18 having a conically concave inner face 19. The wall 18 in the illustrated embodiment of the invention is provided with a pair of radially spaced ports 20, lying on opposite sides of the minor axis of the valve body. Mounted in an annular groove lying substantially medially of the axial dimension of the collar is an annular air seal or gasket 15, preferably composed of a fibrous material such as felt. The spherical outer surface of the zonal body 17, substantially along the peripheral circle of its greatest diameter, forms an air tight joint with this felt annulus in any position of revolution of the valve body.

Mounted in the valve body for rotation about its longitudinal axis is a valve closure, or rotor, 21, here shown as a cylinder having its inner end 22 outwardly convexed to conform to the concave inner face 19 of the valve body. The face of the opposite end of the valve closure is rendered re-entrant by means of a relatively deep concavity 23.

The valve closure is provided with channels 24 extending in substantial parallelism therethrough and adapted to register with the ports 20. The outer ends of these channels intersect the concave outer face as ellipses 25, the end of each ellipse that lies adjacent the periphery of the concave face therefore extending farther forward than the opposite end of the same. The outer end of the rotor is formed with an integral collar 26, the periphery of which is knurled to provide a frictional finger grip surface.

The convex inner face, or seated end, of the rotor bears an arcuate slot or groove 27 and the inner face of the concave seat bears a pin or detent 28 adapted to move in said groove a distance limited only by the abutments provided by the ends of the groove. The angular amount of rotation of the rotor can hence be predetermined by the arcuate extent of the groove. In the embodiment illustrated, the angle of arc is on the order of 90°, which is sufficient to permit the valve closure member to be rotated from a position in which the channels 24 register with the ports 20 to a position in which the channels 24 are obturated by the imperforate portion of the wall 18, and of course, through all intermediate positions of orifice-forming relationship of the rotor and the valve body.

A stem 29, formed coaxially with the member 21 on the inner end thereof, projects through an aperture 30 in the transverse wall 18 and extends beyond the rear face of the valve body. The outer end of the stem is surrounded by a helical spring 31, which bears at each end against a washer 32. The spring is held in place by a cotter pin 33 and in turn maintains the convex end of the rotor seated substantially fluid-tightly, but rotatably, against the inner face 19 of wall 18.

In assembling and installing the valvular article, the zonal valve body 17 is inserted edgewise, or in a transverse position, in the collar 13, with the two spherical surfaces that lie at the end of any major or transverse axis that is, the axis coincident with a diameter of the spherical body 17, fitting into the kerfs or grooves 16. In this position, the truncated, or end, faces of the zonally shaped valve body lie in parallelism with the minor axis of the collar. The valve body is then urged inwardly until its major axis lies inwardly of the location of the kerfs or grooves and substantially on the horizontal center plane of the spherical inner wall of the collar. It can then be rotated about its major axis until the truncated faces lie in parallelism with the planar portion of the mounting member, the minor axis of the spherical zone that is, the axis normal to the parallel end faces of the body 17, then lying coaxial with the minor axis of the mounting member.

The valve closure member, or rotor, is then inserted coaxially into the hollow portion of the valve body and rotatably, but fluid tightly, anchored therein by means of the helical spring 31 and pin 33.

The assembled valvular article is then attached to the wall of the compartment with the fluid discharging end protruding into the compartment through the ventilating aperture in the wall, the flange of the mounting member being secured to the exterior face of said wall, concentrically with said aperture, by suitable fasteners, not shown.

An occupant of the compartment can readily regulate the volume or direction of the air stream entering the compartment by suitably manipulating the knurled end of the valve closure member. Manipulation to effect rotation of the closure member in the valve body varies the effective diameter of the discharge channels 24. By virtue of these means, substantially any desired rate of volume of flow may be obtained, depending, of course, upon the pressure at the inlet ports 20.

Manipulation to effect rotation of the valve body, about its major axis, its minor axis, or about both axes simultaneously, provides a wide range of adjustability of the angle at which the fluid is directed into the compartment, and enables ventilation of substantially any desired area or location in the compartment. The lateral angle at which the entering air stream can be directed can be varied through substantially 360°. The vertical angle, with reference to the plane of the attachment flange, at which the entering air stream can be directed, can be varied through substantially 180°. The valve body can also be adjusted through a multitude of angles that are a compound of a vertical and a lateral angle, that is, through angles that lie intermediate the vertical and the lateral, with reference to the datum plane provided by the flange of the mounting member. With reference to the interior of the compartment, therefore, the valvular article is capable of substantially universal movement, being angularly adjustable about all three axes in space.

Automatic compensation for wear occurring on either the concave seat 19 in the valve body or on the convex end 21 of the valve closure member, is provided by the take-up action of the biasing group on the end of the stem of the closure. As the surfaces wear, the spring expands and pulls the worn seating surfaces of the valve closure and the valve body together, re-establishing them in fluid-tight contact. The felt washer interposed between the mating spherical surfaces on the valve body and on the interior of the collar, provides a fluid-tight, but flexible, joint thereat, in any position of the valve body 17.

It will be seen that the concavity in the face of the outer end of the valve closure member provides rearwardly inclined exit ports 25 for the channels 24. The air stream hence emerges from the inner peripheral portion of each port before emerging from the outer edge thereof, and these two emerging portions expand inwardly and mix, creating turbulence and decreasing the velocity of the air stream directed onto the occupant of the compartment. By thus breaking up the laminar flow and the force of the air stream, the compartment occupant is never subjected to a "draft" from the valve mechanism of the present invention.

Various refinements and modifications of the particularly described shapes, and relative arrangements of the parts of the valvular article are contemplated by the invention, and all lie within the scope of the subjoined claims.

We claim:

1. A valvular article, comprising: a valve body having surfaces defining a substantially hollow zone of a sphere open at one end and closed at the other, the closed end having an inlet port therein; a cylindrical valve closure rotatably mounted coaxially in said valve body and having a discharge passage adapted to register with said inlet port; and a mounting member for said valve body and valve closure having an axial bore with a spherical seat conforming to the spherical surface of said valve body and adapted to rotatably support the latter.

2. A valvular article, comprising: a valve body having surfaces defining a substantially hollow zone of a sphere open at one end and closed at the other, the closed end having an inlet port therein; a cylindrical valve closure rotatably mounted coaxially in said valve body and having a discharge passage adapted to register with said inlet port; and a mounting member for said valve body and valve closure, said mounting member having an axial bore with a spherical seat conforming to the spherical surface of said valve body and adapted to rotatably support the same, the wall of the bore at one end thereof having diametrically opposed arcuate kerfs therein adapted to admit the valve body into said spherical seat.

3. A valvular article, comprising: a valve body having surfaces defining a substantially hollow zone of a sphere open at one end and closed at the other, the closed end having an inlet port therein; a cylindrical valve closure rotatably mounted coaxially in said valve body and having a discharge passage adapted to register with said inlet port; and a mounting member for said valve body having an axial bore with a spherical seat conforming to the spherical surface of said valve body and adapted to rotatably support said body, the wall of the bore at one end thereof having diametrically opposed arcuate kerfs therein adapted to admit the valve body into said spherical seat, with the minor axis of the body lying substantially at right angles to the minor axis of said spherical seat and free to rotate about its major axis into peripheral conformity with said spherical seat.

4. A valvular article, comprising: a valve body having surfaces defining a substantially hollow zone of a sphere open at one end and closed at the other, the closed end having an inlet port spaced from the center thereof; a valve closure rotatably mounted coaxially in said valve body and having a discharge passage formed therethrough, said passage being parallel to but spaced from the axis of rotation of said closure and adapted to be moved into registry with said inlet port by rotation of said closure to open said article to the passage of air therethrough; and a mounting member for said valve body having an axial bore with a spherical seat conforming to the spherical surface of said valve body and adapted to rotatably support said body, the outer end of said valve closure member having a relatively large, centrally located concavity formed therein, the wall of said concavity intersecting said discharge passage at an angle thereto, said concavity forming an expansion chamber within the end of said closure wherein air discharged thereinto at the one side thereof expands inwardly of said concavity to create turbulence in, and diffusion of, the air flowing outwardly of said concavity.

5. A valvular article, comprising: a valve body having surfaces defining a substantially hollow zone of a sphere open at one end and closed at the other, the closed end having an inlet port therein; a cylindrical valve closure rotatably mounted coaxially in said hollow valve body and having a discharge passage adapted to register with said inlet port; and a mounting member for said valve body having an axial bore with a spherical seat conforming to the spherical surface of said valve body and adapted to rotatably support said body, the outer end of said valve closure member having means thereon enabling simultaneous or separate application of rotational force to the valve closure member and the valve body.

6. A valvular article, comprising: a valve body having surfaces defining a substantially hollow zone of a sphere open at one end and closed at the other, the closed end having an inlet port therein; a cylindrical valve closure rotatably mounted coaxially in said hollow valve body and having a discharge passage adapted to register with said inlet port; and a mounting member for said valve body having an axial bore with a spherical seat conforming to the spherical surface of said valve body and adapted to rotatably support said body, the closed end of said valve body having a substantially central opening therein; a stem centrally carried by the inner end of said valve closure member and projecting through said opening beyond the rear face of said valve body; an abutment member carried by said stem adjacent the outer end thereof; and a resilient member interposed between said abutment and said rear face and adapted to maintain the inner end of the valve closure seated against the closed end of said valve body.

7. A valve unit, comprising: an externally flanged ring including a hub having an axial bore with a spherical inner wall, said wall being formed with diametrically opposed grooves at the outer end of the hub; a valve body comprising a hollow zonal member having a minor axis equal to the length of said grooves whereby said valve body can be rotatably seated in said spherical wall, said valve body having an axial passage closed at one end, the closed end having an inlet port therein; and a rotative valve closure mounted coaxially of said passage with one end resiliently seated against said closed end, said valve closure having a longitudinal channel adapted to register at one end with said port, the other end of said valve closure having a re-entrant face intersecting said channel.

FRANK J. MUFICH.
HOWARD S. ROSS.

REFERENCES CITED

The following references are of record in the file of this patent:

UNITED STATES PATENTS

| Number | Name | Date |
|---|---|---|
| 1,559,057 | Stewart | Oct. 27, 1925 |
| 2,369,303 | Kurth et al. | Feb. 13, 1945 |

FOREIGN PATENTS

| Number | Country | Date |
|---|---|---|
| 351,050 | Great Britain | June 22, 1931 |
| 512,169 | Great Britain | Aug. 30, 1939 |